2,964,570

1,9-DIHYDROXY-2,8-DIMETHYL-5-HYDROXY-METHYLNONANE

James P. Shelley, Drexel Hill, Pa., and George H. Agnew, Haddon Heights, N.J., assignors to Rohm & Haas Company, Philadelphia, Pa., a corporation of Delaware No Drawing. Filed Feb. 14, 1958, Ser. No. 715,180

1 Claim. (Cl. 260—635)

This invention concerns 1,9-dihydroxy-2,8-dimethyl-5-hydroxymethylnonane as a new composition of matter. It further concerns a method for the preparation of this compound.

The compound of this invention is prepared by reacting hydrogen with 2,5,8-tri(alkoxycarbonyl)-1-nonene or alternatively with 2,5,8-tri(alkoxycarbonyl)nonane. The 2,5,8-tri(alkoxycarbonyl)-1-nonene reactants are preferred and particularly advantageous is 2,5,8-tri(methoxycarbonyl)-1-nonene which is readily available commercially as the trimer of methyl methacrylate. Furthermore, it will be readily understood by one skilled in the art that 2,5,8-tri(methoxycarbonyl)nonane may be produced by reacting 2,5,8-tri(methoxycarbonyl)-1-nonene with hydrogen. In the present reaction, it is possible and advantageous to start with 2,5,8-tri(methoxycarbonyl)-1-nonene and react it with hydrogen, substantially simultaneously saturating the double bond and reducing the carboxylic groups.

The present reaction is carried out in the pressure range of 2500 to 5000 p.s.i.g., preferably 3000 to 4000 p.s.i.g. Temperatures in the range of 240° to 290° C. are employed, preferably 270° to 285° C. Harsher conditions than those set forth above lead to cracking of the compound and concurrent thwarting of the objects of this invention and milder conditions produce substantially no reaction. Hence, one is strictly limited to those conditions specifically set forth.

A catalyst is required to effect the present reaction and the only known suitable one is the copper-chromium oxide catalyst. Other known hydrogenation and reduction catalysts either produce no reaction at all or lead to undesirable degradation products. Hence, one is restricted to the one specific catalyst mentioned. It is possible to use the catalyst in amounts by weight of 5 to 30% of the weight of the ester reactant with 10 to 15% preferred.

The time for consummating the reaction varies with conditions as will be understood by one skilled in the art but one continues the reaction until the pressure drop then levels off. There may be employed, if desired, an inert volatile organic solvent, such as an alcohol, but there is apparently no advantage to this since in the reaction itself, there is produced as a by-product, an alkanol, depending on which ester form is used as the reactant. For instance, if the methyl ester form is used, and this would be preferred, there will be produced as a by-product, methanol.

At the conclusion of the reaction, the product is isolated by filtering off the catalyst, stripping off the alcohol by-product and then distilling to obtain the desired product, 1-9-dihydroxy-2,8-dimethyl-5-hydroxymethylnonane. Yields consistently approaching 70% and above are repeatedly achieved.

The present compound is useful as a modifier and plasticizer. It is strikingly effective in imparting water resistance to films of diethylene glycol bis-carbamateformaldehyde condensates. The diethylene glycol bis-carbamateformaldehyde condensates are those contemplated in United States Patent No. 2,774,746.

Normally, films prepared from diethylene glycol bis-carbamateformaldehyde condensates, while effective in many ways, have low water resistance. In fact, when films of diethylene glycol bis-carbamateformaldehyde condensates are tested with a drop (0.5 gram) of water at room temperature, the film is penetrated in from 5 to 30 minutes and frequently the film lifts from the substrate. In contrast, when the product of this invention is incorporated into the diethylene glycol bis-carbamateformaldehyde condensates in amounts of 15 to 40% by weight, preferably 20 to 30% by weight, no appreciable penetration of the film is observed in over 48 hours. Other dihydroxy or trihydroxy compounds employed in place of the compound of this invention, yield films that are able to resist water only from about ten minutes to perhaps two hours.

The product of this invention as well as the method for its preparation may be more fully understood from the following example which is offered by way of illustration and not by way of limitation. Parts by weight are used throughout.

Example

There are added to a Parr rocking bomb, 200 parts of 2,5,8-tri(methoxycarbonyl)-1-nonene and 20 parts of copper-chromium oxide catalyst. The mixture is then heated at 275° to 285° C. under 3000 to 4000 p.s.i.g. hydrogen pressure. The heating is continued until the reaction is complete as evidenced by no further pressure drop (6 to 8 hours). The bomb is cooled, vented, and the product filtered. The product is boiled for about one hour in aqueous 2 to 3% sodium hydroxide solution to remove traces of unchanged ester reactant. The product is distilled at 165° to 180° C. at 0.8 mm. absolute pressure. The product has a saponification number of less than 2, a hydroxyl number of about 750 and an $n_D^{25}$ value of $1.479 \pm .005$. The product is a pale yellow syrupy liquid identified as 1,9-dihydroxy-2,8-dimethyl-5-hydroxymethylnonane.

There is then mixed together 40 parts of an aqueous 50% solution of a diethylene glycol bis-carbamateformaldehyde condensate (as described in Example 1 of United States Patent No. 2,774,746), 5 parts of 1,9-dihydroxy-2,8-dimethyl-5-hydroxymethylnonane, and 0.6 part of toluenesulfonic acid. There is then prepared a 10 mm. film of the above mixture on a glass panel. The film is allowed to air-dry for twenty minutes and then baked for thirty minutes at 250° F. The baked film is observed to be clear and very hard and useful in coating of metal, and the like, surfaces to protect them from oxidation rust and other corrosive forces.

The water resistance of the above cured film is measured by noting the time required for a drop (0.5 gram) of water, placed on the film nad covered with a watch glass, to attack the film in some way (such as softening, disintegration or lifting of the film from the substrate). After 48 hours of this testing, the film is not appreciably attacked. In contrast, a similar film made from the same condensate but without the product of this invention incorporated therein, shows lifting from the substrate in anywhere from ten to thirty minutes in the above-defined water drop test.

A film similar to that prepared above is made employing the same amounts of components except that trimethylolethane is employed in place of 1,9-dihydroxy-2,8-dimethyl-5-hydroxymethylnonane. This film shows disintegration under the water drop test within a period of five minutes. Similar films are attempted using one-half as much trimethylolethane and then twice as much trimethylolethane. In each case, however, these films showed substantially the same results in the water drop resistance test.

There is also prepared a film in which glycerine is employed in place of 1,9-dihydroxy-2,8-dimethyl-5-hydroxymethylnonane in the same amounts as those set forth previously are used. The films prepared from this mixture are readily attacked in the water drop resistance test in from five to ten minutes. The water resistance test is repeated using film prepared in the manner set forth above except that in place of 1,9-dihydroxy-2,8-dimethyl-5-hydroxymethylnonane, there are employed the following compounds: ethylene glycol, diethylene glycol, dipropylene glycol, 2,5-dimethyl-1,6-hexanediol, 2,5-dimethyl-1,6-hex-3-ynediol, 2,5-dimethyloctynediol, 1,2,6-hexanetriol, the monethanolamide of phthalic acid, diethanolamide of phthalic acid, monoethanolamide of sebacic acid, diethanolamide of sebacic acid, monoethanolamide of lauric acid, diethanolamide of lauric acid, pentaerythritol, dipentaerythritol, methyl glucoside and decamethylene glycol. In each instance, the films showed deterioration under the water drop resistance test in a relatively short period of time generally ranging from ten to thirty minutes. The best of the group is 2,5-dimethyl-hexanediol-1,6 in which instance the film resisted water almost four hours, but even here, the present product imparts water resistance that is at least twelve times greater.

We claim:

As a composition of matter, 1,9-dihydroxy-2,8-dimethyl-5-hydroxymethylnonane.

References Cited in the file of this patent
UNITED STATES PATENTS

| | | |
|---|---|---|
| 2,040,944 | Lazier | May 19, 1936 |
| 2,226,202 | Hill et al. | Dec. 24, 1940 |
| 2,385,911 | Chenciek | Oct. 2, 1945 |
| 2,599,468 | McKeever | June 3, 1952 |
| 2,657,242 | Siggia | Oct. 27, 1953 |

OTHER REFERENCES

Riobe et al.: Compt. rend., vol. 231, pages 151–2 (1950).